3,179,170
METHOD OF TREATING WELLS
Fred W. Burtch, Monroeville, Pa., and Jack Sutherlin, Golden, Colo., assignors to The Dow Chemical Company, Midland, Mich., a corporation of Delaware
No Drawing. Filed May 11, 1960, Ser. No. 28,225
4 Claims. (Cl. 166—41)

The invention is concerned with the treatment of a well penetrating a fluid-bearing subterranean formation whereby a treating agent is emplaced in the formation via the well.

Fluids, e.g., oil, gas, brine, and water, contained in the strata of subterranean formations are necessary for maintaining present domestic and industrial activities and for the advancement of science and industry generally.

An ever increasing need exists for greater supplies of the fluids derived from subterranean formations. Not only is locating of such fluid-bearing formations, which are accessible and which produce a fluid in sufficient quantities to be economically operable to meet needs for such fluid, among the more important needs of the people of the world, but continued production of fluids from such formations for a period of time sufficient to remove a substantial portion of the fluids therefrom at a minimum of operating costs and deterioration of equipment is also of great importance.

Conditions which adversely affect production from a well include (1) plugging or blocking of the passageways in the formation leading to the well due to both natural structural conditions and the deposition of plugging materials brought out during production, e.g., water blocks, emulsions of water and oil, deposition of high-boiling constituents of the fluid and of sand and detritus generally from unconsolidated formations; (2) insufficient pressure to force the fluid through the formation to the well; and (3) corrosion of the well tubing and operating equipment in the well. Treatment of a well, as by introducing a composition into the formation traversed thereby, is among the more effective measures employed to increase the rate of production, prolong the producing life, or lessen the deterioration of well equipment.

The principal object of the invention is to provide an improved method of emplacing such well-treating composition into a formation whereby said composition is more effective in improving conditions in the well which are conducive to maximum production and associated with minimum operating costs and less need for repeated treatments. How this and related objects are attained will be made clear in the ensuing description and is printed out concisely in the appended claims.

The invention comprises injecting down a well penetrating a fluid-bearing subterranean formation and thence back into the formation a composition consisting of an adsorbent or absorbent particulate solid having adsorbed on the particles or absorbed into the interstices and pores thereof a chemical treating agent in the liquid state capable of being gradually desorbed from the particulate solid and thereby improving the producing conditions of the well.

Hereinafter the term "sorbent" will usually be used to designate both or either adsorbent and absorbent and "sorb" will be used to mean the act of either adsorbing or absorbing a liquid onto or into a particulate solid material. The particulate solid component of the composition will hereinafter usually be referred to as the "sorbent" and the liquid well treating chemical agent as the "sorbate."

Typical of sorbent materials are clays, e.g., hydrous magnesium alumino-silicates (illustrative of which is montmorillonite), fuller's earth, and bleaching clay; activated clay, e.g., clay or bauxite with which has been admixed a mineral acid such as hydrochloric or sulfuric to form a thick slurry of the clay which is subsequently heated to about 150° F.; aluminous oxide-containing materials, e.g., bauxite, fluorite; activated alumina; bone char which results from the carbonization of bones in the substantial absence of air; coke and charcoal; magnesium oxides both hydrous and anhydrous; silica gel; and aluminum silicates, e.g., pumice, zeolite, and perlite.

Among the sorbates useful in the practice of the invention are inhibitors to the corrosive attack of metal in oil well equipment; solvents for paraffin; inhibitors to the deposition of paraffinic material both in the channels of the formations leading to the wellbore and in the well tubing and moving parts of the equipment; demulsifiers to lessen the tendency of water and oil to emulsify; chelating agents; wetting agents, e.g., a substance to render the formation more oil-wettable or more easily wettable by oil than by water; and acids for the dissolution of calcium carbonate-containing formations.

The above-suggested sorbents and sorbates are illustrative only and all particulate solid adsorbent and absorbent material and all well treating chemical agents which exist as a liquid or can be dispersed or dissolved in a liquid and as such adsorbed or absorbed into the sorbent and are suitable for improving the producing conditions of a well are within the purview of the invention.

A particular disadvantage to known methods of treating wells by injecting a chemical treating agent therein has been that the agent is quickly used and dissipated in the formation adjacent to the well so that the beneficial effect therefrom is relatively short lived. The present invention offers the decided advantage of providing a slow release of the beneficial chemical agent from a composition emplaced in a formation, usually at a substantial distance from the wellbore and often in the more remote portions of the producing formation.

The sorbent may be any substantially inert particulate material, having the capacity to adsorb or absorb onto or into the particulate solid, an appreciable amount of the chemical treating liquid sorbate which is subsequently slowly released, hereinafter sometimes referred to as desorption, after placement in a formation being treated. Desorption is usually carried out or greatly aided by the passage through the sorbent material of fluids of the formation or fluids injected in an injection well and which pass through the formation and gradually carry the desorbed sorbate into portions of the formation to effect a benefit, usually in the direction of a producing well.

The particle size of the sorbent material is not highly critical. It should be sufficiently small when employed with a propping sand in a fracturing operation to enter the fracture produced and propped open by the sand. Particle sizes up to those passing through a No. 4 mesh sieve may be used in practicing the invention. It is recommended, however, that sizes no larger than those passing through a 20 mesh sieve be employed and sizes which will pass through a 60 mesh sieve are preferred. On the other hand, sorbent material of such small particle size that it packs too tightly is not recommended. Particles smaller than about 325 mesh are not satisfactory.

In practicing the invention the sorbent and sorbate are intermixed and then injected into the well and forced back into the formation, usually by employing hydraulic pressure induced by pumping a liquid, e.g., crude oil, into the well following the injection of the mixture of the sorbent and sorbate. The mixture or sorbent and sorbate may be rendered fluid by one of two ways, either by employing an excess of the sorbate, e.g., an aqueous acid solution, or by dispersing the mixture of sorbent and sorbate in a liquid carrier, e.g., water, oil, jelled water, thickened oil, or an oil-water emulsion.

To show the effectiveness of the method of the invention wherein a chemical agent is emplaced in a well whereby it is gradually released, in contrast to the conventional method of injecting such an agent, a series of tests was run, employing an apparatus consisting of a vertically positioned 1-inch diameter pipe, 8 inches long referred to hereinafter sometimes as the test cell and provided with suitable supply and exit lines and vessels. Into the upper end of the test cell was inserted a nipple and a coupler assembly for admitting a liquid, e.g., water or oil, and to the lower end of the test cell was attached a nipple and a coupler assembly, provided with a screen, for permitting exit of liquid from the lower end of the test cell but retaining the particulate material therein. A suitable inlet leading from a liquid supply and an outlet line leading from the test cell to a sump were provided and equipped with appropriate flow control valves and gauges to ascertain rate of flow and pressure.

The first series of tests was run as follows: The upper coupler assembly was disengaged and the 8-inch long pipe or test cell charged with a mixture of an inhibitor to metal corrosion, designated Inhibitor X, and either 60–80 mesh Ottawa propping sand only for comparative purposes in Tests 1 and 3, or 10–20 mesh fuller's earth and subsequently with the propping sand in accordance with the invention in Tests 2 and 4.

Inhibitor X was prepared as follows:

(1) A surfactant was made containing an inhibitor to the corrosion of metal in accordance with that described in United States Patent No. 2,698,295. The surfactant thus prepared consisted of about 30 percent by weight of sodium alkyl sulfonamidoacetates, wherein the alkyl groups were predominately those containing 18 carbon atoms, and the balance sulfonamides and sodium sulfonates of $C_{18}$ alkyl groups with lesser amounts of water and up to 4 percent of sodium hydroxide.

(2) The surfactant thus made was admixed with a mineral α1 in the amounts of 45 percent by volume of the surfactant and 55 percent by volume of a mineral oil. The mineral oil-anionic surfactant mixture was then admixed in the amount of 1610 parts by weight with 1549 parts by weight of the condensation product prepared by condensing 1 mole of a rosin amine with 11 moles of ethylene oxide.

(3) The mixture thus made was then admixed with 158 parts by weight of a technical grade dehydroabietyl amine.

(4) Thereafter, 208 parts by weight of water were admixed with the resulting mixture.

The material thus made is an effective inhibitor to the corrosion of metal and has been found to be particularly suitable for protecting well equipment.

Table I sets forth the amounts of sorbent (fuller's earth), and sorbate (Inhibitor X), and propping sand employed in Tests 2 and 4 which illustrate the practice of the invention and the amounts of Inhibitor X and sand only employed in Tests 1 and 3 which were made for comparative purposes. The effectiveness of the practice of the invention in contrast to conventional practice is shown by the concentration in parts per million (p.p.m.) of Inhibitor X in the effluent from the test cell after measured periods of time, at about 80° F. (room temperature) at a controlled flow rate of 200 milliliters per minute in each test.

TABLE I

| Test run number | 1 | | 2 | | 3 | | 4 | |
|---|---|---|---|---|---|---|---|---|
| Gm. of Ottawa sand used: (60 to 80 mesh) | 180 | | 130 | | 180 | | 190 | |
| Gm. of fuller's earth used: (10 to 20 mesh) | None | | 20 | | None | | 0.7 | |
| Gm. of Inhibitor X adsorbed | 10.1 | | 10.9 | | 0.36 | | 0.38 | |
| | Test period in hr:min. | Inhibitor in effluent in p.p.m. | Test period in hr:min. | Inhibitor in effluent in p.p.m. | Test period in hr:min. | Inhibitor in effluent in p.p.m. | Test period in hr:min. | Inhibitor in effluent in p.p.m. |
| | 0:005 | 63,000 | 0:025 | 1,900 | 0:025 | 600 | 0:005 | 780 |
| | 0:01 | 28,000 | 0:05 | 780 | 0:05 | 7 | 0:01 | 200 |
| | 0:015 | 5,100 | 0:30 | 140 | 0:30 | None | 0:02 | 120 |
| | 0:02 | 1,340 | 1:00 | 39 | | | 0:03 | 75 |
| | 0:03 | 600 | 2:00 | 17 | | | 0:04 | 49 |
| | 0:04 | 260 | 4:00 | 10 | | | 0:06 | 38 |
| | 0:05 | 20 | 6:00 | 4 | | | 0:08 | 31 |
| | 0:06 | 12 | 8:00 | 4 | | | 0:20 | 12 |
| | 0:07 | 12 | 8:30 | 4 | | | 0:30 | 2 |
| | 0:08 | 6 | 9:00 | 3 | | | | |
| | 0:10 | 5 | | | | | | |
| | 0:15 | 1 | | | | | | |

An examination of the results set forth in Table I, obtained at identical flow rates of 200 milliliters per minute, shows that in Tests 2 and 4, wherein the fuller's earth was used as the sorbent material, the sorbate was released at a definitely slower rate than in Tests 1 and 3 wherein sand alone was used. For example, in Test 2 employing 10.9 grams of the Inhibitor X adsorbed on fuller's earth, there was still 4 parts per million of the sorbate in the effluent coming from the test cell after 8 hours and 30 minutes flow, whereas in contrast thereto, where no fuller's earth was employed as the sorbent material, Test 1 showed 63,000 parts per million to exit in the effluent after 0.5 minute flow, only 5 parts per million at the end of 5 minutes, and only 1 part per million at the end of 15 minutes and Test 3 showed only 7 parts per million after 5 minutes and none after 30 minutes. It is obvious that the inhibitor would shortly be completely dissipated and no beneficial results existent within a relatively short time when the inhibitor was employed with sand alone.

Since a weight of 0.38 sorbate to 0.7 sorbent is about 0.5 to 1.0, a satisfactory sorbent for use in the practice of the invention is considered to be one that would yield at least 2 parts per million parts of effluent after about 30 minutes when employing about 0.5 part by weight of liquid sorbate per part of sorbent solids in accordance with the tests employed in Table I.

The tests of Table I were repeated in a second series of tests employing the same testing apparatus as used therein except that the sorbate, viz., Inhibitor X, was first dissolved in a volatile organic solvent in an amount of 50 percent by weight of each of the solvent and the sorbate (4 grams of each) and then admixed with 15 grams of the sorbent material set out in Table II below. The presence of the organic solvent lowered the viscosity of the sorbate and facilitated the intermixing thereof with the sorbent material.

Thereafter the thus prepared mixture of sorbent and

Inhibitor X as the sorbate, containing the volatile solvent, was dried for 2 hours to remove substantially all the organic solvent. There was thus left the dried Inhibitor X-sorbent material mixture in a ratio of 4 grams of the inhibitor to 15 grams of the adsorbent. 150 grams of 20–40 mesh Ottawa sand was then admixed with the inhibitor-sorbent mixture. The 8-inch long test cell of the apparatus was then charged with the mixture thus made and placed in position in the testing apparatus. An oil consisting of 95 parts by volume of kerosene and 5 parts by volume of xylene was then made up. Water and the oil mixture thus made were each then passed simultaneously through the charge in the test cell in a ratio of 9 water to 1 of the oil by volume. The total flow rate of both water and oil was 200 milliliters per minute. The temperature was 80° F. The most pertinent data observed during the run are set out in Table II. The rate at which the sorbate, viz., Inhibitor X, left the site of the sorbent material, i.e., was desorbed, as the water-oil was passed therethrough was measured in parts per million in the effluent after specified periods of time as in Tests 1 to 4 and is set out in Table II.

TABLE II

Desorption time of various sorbents at the following operating conditions:
Temperature _____ 80° F.
Flow rate _____ 200 ml./min.
Water/oil ratio _____ 9/1 by volume.
Charge _____ 150 g. sand, 15 g. sorbent, and 4 g. sorbate.

| Test No. | Sorbent employed | Solvent employed | Desorption time in hours required for concentration of effluent to drop to 4 p.p.m. |
|---|---|---|---|
| 5 | 10 to 20 mesh fuller's earth | Benzene | 7.0 |
| 6 | do | Acetone | 6.5 |
| 7 | 10 to 20 mesh coke | do | 3.0 |
| 8 | 10 to 20 mesh charcoal | do | 2.0 |
| 9 | 20 to 40 mesh walnut hull | do | 1.5 |
| 10 | 10 to 20 mesh silica gel | do | 0.5 |

Reference to Table II shows that when the liquid sorbate was first admixed with the volatile organic solvent named, in the amount of 50 percent by weight of each, thereafter admixed with the sorbent solid material, and subsequently dried to volatilize away the organic solvent, that the desorption rate was very clearly and markedly retarded. Fuller's earth is shown to have the most retardant effect. Although little difference was noted to exist when fuller's earth was admixed with benzene when compared with its being admixed with acetone, a slight advantage appears to result from the use of the acetone.

Further test runs were made employing an inert imidazoline-type inhibitor to the corrosive attack of an acid on metal. The inhibitor had a viscosity of 40 centipoises at about 75° F. The imidazoline type inhibitor was employed in an amount of 4 grams thereof to 15 grams successively of each of the following in separate tests: 20 to 40 mesh size fuller's earth, coke, and perlite to ascertain the effect on desorption. The procedure followed was substantially that followed in the runs set out in Tables I and II. A blank test was run employing the treating agent with 20 to 40 mesh size Ottawa sand only. The inert imidazoline-type inhibitor employed herein as the sorbate liquid was found to desorb from the fuller's earth, the coke, or the perlite in the practice of the invention, at substantially the same rate as was found for the Inhibitor X as set forth in Table II. When the imidazoline type inhibitor was employed with Ottawa sand, only, in the blank test run for comparative purposes, it was found to desorb at a rate approximately 20 times that from the fuller's earth, coke, or perlite. Typical of the results obtained in this series are the following: when the inhibitor was first sorbed onto the fuller's earth, coke or perlite in accordance with the invention, 5 parts per million of the imidazoline type inhibitor were found in the effluent oil-water mixture after 2 hours and 2 parts per million after 3 hours. In contrast thereto, when the inhibitor was used with sand in accordance with conventional practice, the inhibitor was found in the amount of 6 parts per million after 6 minutes, 4 parts per million after 7 minutes, and only 1 part per million of the effluent after 15 minutes.

The results of these runs clearly show that the imidazoline type inhibitor, employed as the sorbate, is similarly desorbed slowly from the fuller's earth, coke, or perlite as was Inhibitor X and at a clearly retarded rate in contrast to the rate at which the same chemical passes into the formation in conventional practice.

Another series of tests was run to ascertain the effect on the capacity of a sorbent material to sorb a well-treating liquid wherein Inhibitor X as the sorbate was first admixed with a volatile organic solvent such as acetone and benzene when the amount of such solvent was varied. The sorbate-solvent mixture was then admixed with fuller's earth as the sorbent material and dried to remove the organic solvent. The results are set out in Table III.

TABLE III

SORPTION BY FULLER'S EARTH FROM A VOLATILE SOLVENT

| Test No. | Percent Inhibitor X | Solution of sorbate and solvent | Percent volatile solvent | Amount of grams of Inhibitor X sorbed on 20 grams of fuller's earth (10–20 mesh) |
|---|---|---|---|---|
| 11 | 75 | 25 | Acetone | 8.0 |
| 12 | 50 | 50 | do | 9.0 |
| 13 | 35 | 65 | do | 5.6 |
| 14 | 30 | 70 | do | (1) |
| 15 | 25 | 75 | do | (2) |
| 16 | 75 | 25 | Benzene | 3.6 |
| 17 | 50 | 50 | do | 8.0 |
| 18 | 35 | 65 | do | 6.4 |
| 19 | 25 | 75 | do | 6.4 |

[1] Incomplete solubility.
[2] Precipitate formed when inhibitor and acetone were mixed.

Reference to Table III above shows that by intermixing the sorbate with an effective amount of a volatile organic solvent, to facilitate intermixing of the solids and liquid, and then admixing the sorbate-solvent mixture with the sorbent material and drying the mixture to remove the organic solvent, the capacity of the sorbate to be sorbed by the particulate sorbent improved until an excess amount of the organic solvent was employed which appears to be between about 50 and 65 percent of the organic solvent based on the weight of the sorbate liquid. The results of Table III show, for example, that, when 75 percent of Inhibitor X as the sorbate was admixed with 25 percent of acetone as the solvent, by volume, and the weight of the inhibitor which would be sorbed by 20 grams of fuller's earth determined, only 8 grams of the sorbate was sorbed (after drying to remove the solvent) whereas a 50:50 volume ratio mixture of inhibitor and acetone permitted 9 grams (after drying) to sorb on the same weight of fuller's earth. Thereafter, however, increasing the percent of acetone to the inhibitor to greater than 50 percent of the acetone in the mixture lessened the capacity thereof to be sorbed.

Another series of tests, consisting of Runs 20 to 22, were made following the procedure generally of the tests set out in Table III above, except that no organic solvent was employed. The tests were made as follows:

Test 20: 20 grams of a 10 to 20 mesh fuller's earth were admixed with increasing amounts of 15 percent hydrochloric acid until the maximum amount of the acid which could be sorbed thereon was ascertained. This amount was 16 grams of the 15 percent hydrochoric acid.

Test 21: 10 to 20 mesh pumice was substituted in place of the fuller's earth of Test 20. The procedure was otherwise substantially the same. Successive evaluations showed that 10.7 grams of the 15 percent aqueous hydrochloric acid solution could be sorbed on the pumice.

Test 22: the condensation product produced by condensing di-secondary-butylphenol and ethylene oxide in a ratio of 10.6 grams of the butylphenol with 10 moles of the ethylene oxide to produce a common oil field surfactant was evaluated by admixing increasing amounts thereof with 20 grams of 10 to 20 mesh fuller's earth until the maximum amount sorbable thereon was determined. This amount was found to be 3 grams.

A further test, No. 23, was run to determine the retardant effect of the product of Test 22 upon the rate of desorption therefrom of a surfactant employed in well-treating for wetting the walls of the formation. This test was run by admixing 3 grams of the condensation produced with 20 grams of fuller's earth and thereafter intermixing therewith 120 grams of 20 to 40 mesh Ottawa sand. The mixture thus made was placed in the test cell of the apparatus employed in the test runs above and water alone employed as the fluid which was forced thereinto and through the charge in the cell of the apparatus. Thirteen liters of water were passed therethrough and the surface tension of the effluent measured. After this amount of water had been passed through, an effective amount of surfactant, as evidenced by reduced surface tension, was still present in the effluent. It is apparent that the wetting effect of this condensation product which is currently employed widely to increase the water wettability of formations in the production of brine, has a protracted beneficial effect on lessening resistance to the passage therethrough of aqueous fluids when employed in accordance with the invention.

A further series of tests was run employing a sorbate, which has for its end object the breaking of water-oil emulsions in oil producing formations. Emulsions are objectionable in such formations, one particular objection being the blocking of the flow of oil to the wellbore. The sorbate employed herein is designated Z. The apparatus employed in this test to ascertain the retardant effect on the sorption of the demulsifier from 10–20 mesh size fuller's earth was similar to that employed above but was equipped with a 1¼ inch diameter test cell, 5 inches long and made of Plexiglas, instead of the metal cell of the size employed in the previous tests.

Demulsifier Z was prepared as follows: Castor oil, aminoethanol amine, and a relatively high boiling aromatic naphtha were admixed in parts by weight of 5480 parts of the castor oil, 1840 parts of the aminoethanol amine, and 1880 parts of the aromatic naphtha. The admixture thus made was heated, while beeing agitated, to 455° F., and thereafter held at a temperature above 338° F. and below 455° F. for 9 hours. During this time some water formed, apparently as a reaction product. The water present accumulated as a water phase above the oil phase and was subsequently removed. The organic phase or residue appeared to be a mixture of imidazoline, which was formed by the interaction of ricinoleic acid, and aminoethylethanolamine with some glycerine and monoglyceryl ricinoleates being present in minor amounts. 3400 parts by weight of the residue thus formed were then charged into a kettle and heated to 122° F. Thereafter 900 parts by weight of maleic anhydride were added which reacted exothermally with the admixture in the kettle, the resulting rising temperature being held below 176° F. The reaction product thus formed was stirred for about 15 minutes at the temperature of reaction but below 176° F. It was then cooled and 5,000 parts by weight of isopropyl alcohol, followed by 3960 parts by weight of water, were added thereto, with stirring. The reaction product thus made is a highly effective demulsifier in the treatment of wells. This reaction product is sometimes referred to as a quaternary ammonium compound containing complex amides and esters and derivatives of aspartic acid. The fuller's earth-Demulsifier Z composition thus made was then admixed in an amount of 29 grams thereof (20 grams fuller's earth and 9 grams of Emulsifier Z) with 120 grams of 60 to 80 mesh sand and placed in the above-described 5-inch Plexiglas test cell in the testing apparatus. Water at 80° F. and at a flow rate of 54 ml. per min. was passed therethrough.

The surface tension in dynes per centimeter, at 80° F., of effluent from the cell was measured periodically. Since the measurement of actual changes in surface tension are subject to some error, the results were ascertained in this series of tests by making up fresh aqueous solutions containing known amounts of the demulsifier, measuring the surface tension thereof, and comparing the surface tension values of the freshly made aqueous solutions with the surface tension values of the effluent from the test cell. The results are set out in Table IV.

TABLE IV

SURFACE TENSION OF VARIOUS CONCENTRATIONS OF DEMULSIFIER Z IN WATER

| Freshly made-up aqueous solutions for comparative evaluation | | Test No. | Aqueous effluent from test cell | |
| --- | --- | --- | --- | --- |
| Concentration of demulsifier in percent by weight | Surface tension in dynes/cm. | | Volume of water through column in ml. | Surface tension in dynes per cm. |
| None [1] | 73.9 | 24 | None | 73.9 |
| 0.005 | 46.4 | 25 | 100 | 49.7 |
| 0.010 | 40.2 | 26 | 200 | 48.0 |
| 0.050 | 36.9 | 27 | 300 | 49.7 |
| 0.100 | 35.7 | 28 | 400 | 50.6 |
| 0.200 | 37.5 | 29 | 1,050 | 49.1 |
| 0.500 | 35.4 | 30 | 2,100 | 47.6 |
| | | 31 | 3,150 | 48.8 |

[1] Conversion to parts per million may be readily made since 0.005 percent=50 p.p.m.

An examination of the results of Table IV shows that when the demulsifier is first sorbed on a particulate material such as fuller's earth, and thereafter subjected to desorption by a fluid passing therethrough, the concentration of the demulsifier in the effluent fluid is gradual and the concentration of the demulsifier therein remains relatively high. For example, after passing 3150 milliliters of water through the charge, the surface tension in dynes per centimeter was 48.8 which was about the same value as it had been after only 100 ml. of water had passed therethrough. It is to be further noted that surface tension values throughout the series of values obtained on the effluent were comparable to the 46.4 dynes per cm. surface tension of the 0.005 percent freshly made up aqueous solution. The results show that the practice of the invention would release demulsifier, to waters passing through the composition, for a protracted period of time.

The effect of temperature upon the rate of desorption of the sorbate from the sorbent material is not great. There appears, therefore, to be no critical temperature limitation necessary in practicing the invention. As the temperature is increased, however, the rate of desorption is found to increase to some extent. But, the lower temperatures which exist in fluid-producing formations will permit desorption at a rate sufficiently fast to be highly effective in the treatment of the formation. On the other hand, any temperatures found to exist in fluid-producing formations result in a retardant desorption rate which permits release of the chemical treating agents into the formation at a much slower rate than one of the heretofore most effective known methods, e.g., "squeezing" the treating chemicals into the formation.

The following examples illustrate the practice of the invention in wells penetrating oil-producing formations.

*Example 1*

The well treated in this example was an injection well in a field where oil was being produced by the water flood method, i.e., water was injected through one well to force oil in the formation in the direction of, and outwardly from, one or more producing wells. The injection well treated was 4069 feet deep and penetrated a pay zone extending from a 4028 depth to a 4069 foot level. It was cased with a 5½ inch casing to a depth of 4028 feet. Prior to treatment, flooding was carried on by injecting water into the well at a pressure of 767 p.s.i.g. At this pressure, however, only 75 barrels of water per day could be injected into the well. It was desired to increase the volume of water without increasing the injection pressure. Wells similarly situated and serving a similar purpose in the field had been formerly acidized, or fractured with an acid solution, to attain this objective in those wells. In the instances where such wells were acidized or fractured according to known practice, there resulted a substantial reduction in the pressure required and/or water injection rate at the same or lower pressure but the pressure required to inject the water into the wells thus treated began to rise almost immediately after such treatment and within a relatively short time, usually within two months, the injection pressures required prior to treatment were again necessary to get the water into the wells at the same rate, and thereafter such pressure requirements gradually continued to increase.

The well of this example was treated as follows: a composition in accordance with the practice of the invention was prepared by admixing 10 gallons of an alkyl pyridine type inhibitor to the corrosion of metal, 75 pounds of guar gum, and 2,000 gallons of 15 percent by weight aqueous hydrochloric acid. A suspension of guar gum in an aqueous acid was thus prepared which had a viscosity of 82 centipoises. To this inhibited thickened acid solution were then added 2,000 pounds of a 10 to 40 mesh size pumice and 1,000 pounds of 20 to 40 mesh Ottawa propping sand. The gelled composition thus prepared was then employed as a fracturing liquid by pumping it into the well and forcing it back into the formation at fracturing pressures. It will be observed in practicing the invention in this example, that the hydrochloric acid solution served both as a carrying medium as well as the sorbate. The amount of acid and sorbent pumice employed was not limited to the maximum amounts of acid, shown by the tests to be sorbed on pumice stone, but an excess of acid was employed to serve as the carrier of the composition. Hydrochloric acid is relatively inexpensive and was useful both as a carrying liquid and in cleaning up the well. After treatment, the well was put back into production and it was found that 208 barrels of water per day could be injected into the well at a pressure of 525 p.s.i.g. Three months after the treatment 140 barrels of water per day could be injected into the well at 770 p.s.i.

It is clear from an examination of the sample above that the effect of the hydrochloric acid on the formation extended over a relatively long period of time showing a gradual release thereof from the pumice into the formation. For example, at the end of three months, almost twice as much water per day could be injected into the well at approximately the same pressure as was employed prior to the invention.

Many oil producing wells are plagued by emulsion blockage, i.e., the accumulation of oil-water emulsion in the formation which adversely affect the flow of fluids to the wellbore. Forming of oil-water emulsions is often aggravated by the employment of conventional aqueous treating fluids, which are extensively employed because of their availability and lower initial cost. To overcome the emulsion blockage in producing formations, demulsifying agents are frequently injected into the well to break down the emulsions and thereby lessen the blocking effect of the emulsions. However, the use of such emulsifying agents has resulted in short-lived improvements because of the rapid dissipation of the agents in the well.

*Example 2*

A well was treated in accordance with the invention for the purpose of lessening the adverse effect of emulsions in the formation penetrated thereby. The well was 6330 feet deep and had a casing therein which was perforated between the levels of 6204 and 6285 feet. Considerable difficulty was encountered in producing from this wall because a highly viscous emulsion of oil and water was produced which required subsequent treatment to break the emulsion. The emulsion, when broken, showed it to average, 11 barrels of oil and 3 barrels of water per day. The flow from the well as an emulsion not only reduced the production therefrom to an estimated 50 percent but required that the emulsion be broken before it was introduced into a pipe line.

The well was treated as follows: 1,000 gallons of a 15 percent by weight hydrochloric acid solution containing 8 gallons of sodium arsenite, an inhibitor, were pumped into the well. This acid treatment was for the purpose of cleaning up the well and providing enlarged voids in the formation for the deposition of the composition of the invention as a preparatory step. The acid step was then followed by the injection into the well of 10,000 gallons of water containing 450 pounds of guar gum to form a thin gel. Thereafter, in accordance with the practice of the invention, 40,000 pounds of 20 or 40 mesh propping sand and 250 pounds of a composition consisting of 140 pounds of fuller's earth having adsorbed thereon, or absorbed therein, 110 pounds of the demulsifier composed of 55.2 pounds of a nonionic surfactant having the empirical formula of:

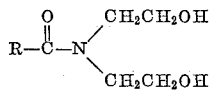

where R equals an alkyl group containing between 12 and 18 carbon atoms or a mixture thereof, and 54.8 pounds of the sodium salt of an alkyl sulfonate admixed with isopropyl alcohol as a solvent in the ratio of 80 percent of the sulfonate to 20 percent of the isopropyl alcohol. The fuller's earth-demulsifier mixture thus made was pumped into the well at a rate of 35.5 (42 gallons) barrels per minute culminating in a pressure sufficient to fracture the formation. The fracturing step was then followed by the injection of 3780 gallons of water as a flush. The well was then returned to production. Marked lessening in production difficulties due to emulsions in the formation was noted. The production rate immediately after treatment was 52 barrels of oil and 18 barrels of water which readily separated on standing. Two months after treatment, production figures had remained substantially unchanged.

Thereafter, three other wells, of similar depth and having similar emulsion difficulties to the well thus treated and located in the same producing field, were then treated according to the invention following the procedure set out immediately above.

Each of the three wells thus treated were examined between 50 and 60 days following treatment. No emulsion difficulties were found then to exist in any of the wells and production rates had greatly increased.

It is clear, from the results of the wells treated in accordance with the invention in Example 2 for the purpose of overcoming emulsion difficulties in the formation, that the demulsifier contained in the composition thus injected was released gradually into the formation and provided protection against blocking of flow by the emulsions therein in a manner far superior to that attained when demulsifiers are injected into a well in accordance with known practice.

A number of advantages are to be realized by the practice of the invention among which are: an improved method of more precisely locating inhibitors, demulsifiers, acidizers, paraffin solvents, paraffin inhibitors, sequestering agents, anti-foaming agents, and the like in a formation; the injection of such beneficial compositions in the formation simultaneously with fracturing; the injection of the composition in accordance with the invention into the well by acidizing or other well treatment; the attainment of any of the above and other beneficial effects that can be derived from the injection of a well-treating agent (which may be adsorbed on or absorbed in a particulate solid and is substantially inert chemically to such agent) for a protracted period of time, far in excess of that attained when such treating agents are injected into a well according to known practice; improved method of inhibiting the deposition of paraffin or other hydrocarbonaceous substances on tubing and well equipment.

Particularly effective inhibitors to paraffin deposition, useful in the practice of the invention, as the sorbate is quaternary ammonium chlorides, as a mixture of the chlorides of $C_{21}H_{46}N^-$ and $C_{26}H_{56}N^-$.

Chemical agents useful as demulsifiers as the sorbate in the practice of the invention include polyvinyl alcohol or isoamyl amine dissolved in a suitable vehicle.

Among the oil-wetting agents useful as the sorbate in the practice of the invention are diethanol amide of coconut oil acids, and 2-heptadecyl-1-(2-hydroxyethyl)-2-imidazoline.

Among the water-wetting agents useful as the sorbate of the invention are the condensation product of di-sec-butylphenol and ethylene oxide in a mole ratio of about 1:10, respectively, the condensation product of nonylphenol and ethylene oxide in a mole ratio of about 1:15, respectively, and ammonium isopropyl benzene sulfonate.

Among the scale preventing chemicals useful as the sorbate in the practice of the invention are the versene solutions, sodium hexametaphosphate solutions and citric acid.

Among the corrosion inhibitors useful in the invention is the condensation product of abietyl amine and ethylene oxide in a mole ratio of about 1:11, respectively.

Having described the invention, what is claimed and desired to be protected by Letters Patent is:

1. The method of emplacing a liquid treating agent into the cracks, fissures and pores of a subterranean fluid-bearing formation to be treated which consists essentially of (1) admixing a sorbate-type liquid treating agent, selected from the class consisting of demulsifiers, chelating agents, wetting agents, anti-foaming agents, sequestering agents, acidizing agents, and inhibitors to the deposition of paraffin and to the corrosivity of acids, with a volatile organic solvent; (2) admixing the thus prepared solvent-treated liquid treating agent with a sorbent particulate solid material of a particle size such that it will substantially all pass through a number 10 mesh sieve but will be retained on a number 325 mesh sieve, selected from the class consisting of fuller's earth, montmorillonite clays, acid-treated clays, bauxite, fluorite, activated alumina, bone char, coke, charcoal, magnesium oxide, perlite, magnesium hydroxide, silica gel, pumice stone and zeolite; (3) drying the mixture thus made to remove a substantial portion of the organic solvent to make a flowable intimate intermixture from which the sorbate-type liquid treating agent will gradually desorb when deposited in a subterranean formation; and (4) injecting the intermixture so made into the formation and depositing at least a portion of said intermixture therein whereby said liquid treating agent is thereafter gradually desorbed from the particulate solid material to improve and facilitate production of fluids from the formation.

2. The method according to claim 1 wherein said intimate intermixture is injected into the formation at a rate and pressure sufficient to fracture the formation.

3. The method according to claim 2 wherein the formation is acidized by injecting an acid thereinto prior to the injection of the intimate intermixture, said acid enlarging the channels, passageways, and voids in the formation, thereby to provide enlarged zones of deposition for said particle material.

4. The method according to claim 1 wherein the sorbent particulate solid is fuller's earth having an average particle size between about 60 mesh and 325 mesh and the volatile organic solvent employed is selected from the class consisting of benzene and acetone and the liquid treating agent is an imidazoline-type of inhibitor of corrosivity to metal.

References Cited by the Examiner

UNITED STATES PATENTS

| | | | |
|---|---|---|---|
| 2,287,567 | 6/42 | Porter | 252—331 |
| 2,681,704 | 6/54 | Menaul | 166—22 |
| 2,785,752 | 3/57 | Bond et al. | 166—42 |
| 2,797,196 | 6/57 | Dunn et al. | 252—8.5 |
| 2,877,180 | 3/59 | Park et al. | 252—8.55 |
| 2,879,847 | 3/59 | Irwin | 252—8.55 |
| 3,021,901 | 2/62 | Earlougher | 166—42 |
| 3,028,913 | 4/62 | Armentrout | 166—29 |

CHARLES E. O'CONNELL, *Primary Examiner.*

BENJAMIN BENDETT, *Examiner.*